United States Patent
Zhong et al.

(10) Patent No.: US 11,251,643 B2
(45) Date of Patent: Feb. 15, 2022

(54) LINEAR ACTUATOR FOR WIRELESS CHARGING

(71) Applicants: Hanwan Zhong, Fujian (CN); Ming Liu, Hubei (CN)

(72) Inventors: Hanwan Zhong, Fujian (CN); Ming Liu, Hubei (CN)

(*) Notice: Subject to any disclaimer, the term of this patent is extended or adjusted under 35 U.S.C. 154(b) by 399 days.

(21) Appl. No.: 16/562,422

(22) Filed: Sep. 5, 2019

(65) Prior Publication Data

US 2019/0393714 A1   Dec. 26, 2019

(51) Int. Cl.
| | |
|---|---|
| *H02J 7/02* | (2016.01) |
| *H02K 11/00* | (2016.01) |
| *H02J 50/10* | (2016.01) |
| *H02J 50/00* | (2016.01) |
| *H02K 11/30* | (2016.01) |

(52) U.S. Cl.
CPC .............. *H02J 7/025* (2013.01); *H02J 50/10* (2016.02); *H02K 11/0094* (2013.01); *H02J 50/005* (2020.01); *H02K 11/30* (2016.01)

(58) Field of Classification Search
CPC .......... H02J 7/025; H02J 50/10; H02J 7/0063; H02J 50/005; H02K 11/0094; H02K 11/30
See application file for complete search history.

(56) References Cited

U.S. PATENT DOCUMENTS

| | | | |
|---|---|---|---|
| 11,021,894 B1 * | 6/2021 | Zastrow | E05B 47/0669 |
| 2010/0031856 A1 * | 2/2010 | Shoda | H02K 41/02 |
| | | | 108/21 |
| 2020/0091754 A1 * | 3/2020 | Liu | H01M 10/0525 |

FOREIGN PATENT DOCUMENTS

| | | | | |
|---|---|---|---|---|
| CN | 108900042 A | * | 11/2018 | H02K 11/33 |
| WO | WO-2009089834 A1 | * | 7/2009 | A47C 20/041 |

* cited by examiner

*Primary Examiner* — Stacy Whitmore

(57) ABSTRACT

The present invention relates to the field of linear actuators, and in particular, to a linear actuator for wireless charging. The linear actuator for wireless charging of the present invention includes a wireless charging plug, a power-supply control box, a motor linear actuator, and a wireless remote control, and wireless inductive charging is performed between the wireless charging plug and the power-supply control box by using a wireless charging module so as to realize charging of a storage battery and power supply to the motor linear actuator. The power-supply control box and the motor linear actuator can move freely without being limited by cables. Moreover, as the confinement of cables is removed, the structure is simple, and the use becomes more convenient. In addition, the wireless remote control is further used to send control commands to the power-supply control box to realize wireless control.

6 Claims, 1 Drawing Sheet

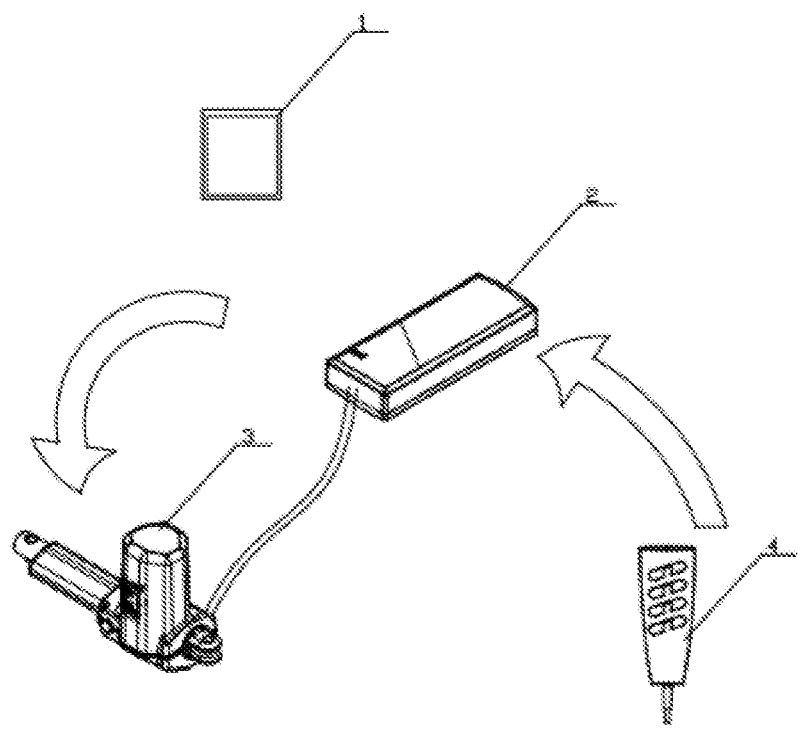

LINEAR ACTUATOR FOR WIRELESS CHARGING

BACKGROUND OF THE INVENTION

The present invention relates to the field of linear actuators, and in particular, to a linear actuator for wireless charging.

An electric linear actuator, also known as a linear driver, is a novel linear actuation mechanism that mainly includes a motor linear actuator, a control apparatus, etc. Its main working principle is that the motor drives a lead screw to rotate. A drive nut is disposed on the lead screw, which is driven to reciprocate when the lead screw rotates, while a worm gear-worm mechanism is usually used between the motor and the lead screw to implement transmission. A common electric linear actuator uses the worm gear and worm for transmission. In particular, a worm on a gear of a motor actuates a worm gear to rotate, so as to enable a small lead screw in the worm gear to make an axial movement, and a connecting plate drives a limiting rod to make a corresponding axial movement. When a required travel is reached, a limiting block is adjusted to press a travel switch to cut off power, and the motor stops running.

However, existing electric linear actuators are all directly connected to indoor 220 V mains sockets through cables, so as to supply power to the electric linear actuators. Therefore, a movement range of an electric linear actuator is limited by the length of a cable. Too short a cable is not convenient for the movement of electric linear actuator, while too long a cable is cumbersome and troublesome to wind and takes up space, resulting in inconvenience in use.

BRIEF SUMMARY OF THE INVENTION

To resolve the foregoing problem, the present invention provides a linear actuator for wireless charging, which adopts a wireless charging manner, is not limited by cables, can move freely during working, and is convenient to use.

To achieve the foregoing objective, the technical solution adopted in the present invention is: A linear actuator for wireless charging includes a wireless charging plug, a power-supply control box, a motor linear actuator, and a wireless remote control. The power-supply control box is electrically connected to the motor linear actuator through a lead. A wireless charging transmitter module is disposed in the wireless charging plug. A wireless charging receiver module, a storage battery, and a circuit control board are disposed in the power-supply control box. The wireless charging receiver module and the circuit control board are electrically connected to the storage battery through leads. The wireless charging plug performs wireless inductive charging on the storage battery through the wireless charging transmitter module and the wireless charging receiver module. A wireless receiver apparatus is disposed on the circuit control board. A corresponding wireless transmitter apparatus is disposed in the wireless remote control. The wireless remote control sends a control command to the circuit control board through the wireless transmitter apparatus and the wireless receiver apparatus. The circuit control board drives the motor linear actuator to reciprocate linearly through the control command.

Further, a charging circuit is built in the power-supply control box to convert power received by the wireless charging receiver module into 12-24V DC power, and then charges the storage battery.

Further, the wireless charging plug is a two-pin plug or a three-pin plug, and the wireless charging plug is externally connected to a 220 V mains socket.

Further, a switch button, a start button, a stop button, and a speed button are disposed on the surface of the wireless remote control, so that the wireless remote control sends control commands of turning on or off the power supply, starting a motor, stopping the motor and motor speed to the power-supply control box.

The wireless remote control is an infrared remote control or a radio remote control.

A control range of the wireless remote control on the power-supply control box is 0 m to 38 m.

The beneficial effects of the present invention lie in that: The linear actuator for wireless charging of the present invention includes the wireless charging plug, the power-supply control box, the motor linear actuator, and the wireless remote control, and wireless inductive charging is performed between the wireless charging plug and the power-supply control box by using a wireless charging module so as to realize charging of the storage battery and power supply to the motor linear actuator. The power-supply control box and the motor linear actuator can move freely without being limited by cables. Moreover, as the confinement of cables is removed, the structure is simple, and the use becomes more convenient. In addition, the wireless remote control is further used to send control commands to the power-supply control box to realize wireless control, and the control manner is more convenient and rapid.

BRIEF DESCRIPTION OF THE DRAWINGS

FIG. 1 is a schematic structural view of the present invention.

Reference Numerals: 1. wireless charging plug; 2. power-supply control box; 3. motor linear actuator; and 4. wireless remote control.

DETAILED DESCRIPTION OF THE INVENTION

To make the technical problems resolved by the present invention, the technical solutions, and the beneficial effects clearer and more comprehensible, the present invention is further described below in detail with reference to the accompanying drawings and embodiments. It should be understood that the specific embodiments described herein are merely illustrative of the present invention and are not intended to limit the present invention.

Referring to FIG. 1, the present invention relates to a linear actuator for wireless charging, including a wireless charging plug 1, a power-supply control box 2, a motor linear actuator 3, and a wireless remote control 4. The power-supply control box 2 is electrically connected to the motor linear actuator 3 through a lead. A wireless charging transmitter module is disposed in the wireless charging plug 1. A wireless charging receiver module, a storage battery, and a circuit control board are disposed in the power-supply control box 2. The wireless charging receiver module and the circuit control board are electrically connected to the storage battery through leads. The wireless charging plug 1 performs wireless inductive charging on the storage battery through the wireless charging transmitter module and the wireless charging receiver module. A wireless receiver apparatus is disposed on the circuit control board. A corresponding wireless transmitter apparatus is disposed in the wireless remote control 4. The wireless remote control 4 sends a control command to the circuit control board through the wireless transmitter apparatus and the wireless receiver apparatus. The circuit control board drives the motor linear actuator 3 to reciprocate linearly through the control command.

Compared with the prior art, the linear actuator for wireless charging of the present invention includes the wireless charging plug 1, the power-supply control box 2, the motor linear actuator 3, and the wireless remote control 4, and wireless inductive charging is performed between the wireless charging plug 1 and the power-supply control box 2 by using a wireless charging module so as to realize charging of the storage battery and power supply to the motor linear actuator 3. The power-supply control box 2 and the motor linear actuator 3 can move freely without being limited by cables. Moreover, as the confinement of cables is removed, and the use becomes more convenient.

Further, a charging circuit is built in the power-supply control box 2 to convert power received by the wireless charging receiver module into 12-24V DC power, and then charges the storage battery.

Further, the wireless charging plug 1 is a two-pin plug or a three-pin plug, and the wireless charging plug 1 is externally connected to a 220 V mains socket.

Further, a switch button, a start button, a stop button, and a speed button are disposed on the surface of the wireless remote control 4, so that the wireless remote control 4 sends control commands of turning on or off the power supply, starting a motor, stopping the motor and motor speed to the power-supply control box 2.

The wireless remote control 4 is an infrared remote control or a radio remote control. The wireless remote control 4 in this embodiment uses an eight-button FSK wireless remote control 4.

A control range of the wireless remote control 4 on the power-supply control box 2 is 0 m to 38 m.

The present invention is further described below by using a specific embodiment.

In this specific embodiment, during use, the wireless charging plug 1 is inserted in a 220 V mains socket. Then, the wireless charging transmitter module in the wireless charging plug 1 can perform wireless induction with the wireless charging receiver module in the power-supply control box 2, to implement wireless charging of the storage battery, so that the charging is more convenient and faster. In addition, the wireless remote control 4 is further used to send control commands of turning on or off the power supply, starting a motor, stopping the motor and motor speed to the power-supply control box 2, so as to control the start, stop, and speed of the motor, so that the motor drives a linear actuator to make a linear telescopic movement. Compared with a conventional motor linear actuator, complex cables are omitted, and both the charging manner and the control manner become more convenient and simpler.

In this specific embodiment, the wireless remote control 4 can control the power-supply control box 2 in a range of 38 meters, and the wireless control range is wide. The wireless remote control 4 realizes wireless control by means of Infrared or Radio. In addition, both electromagnetic induction and radio wave can be used to implement wireless charging between the wireless charging plug 1 and the power-supply control box 2 in this specific embodiment.

The foregoing is merely description of preferred embodiments of the present invention, but is not intended to limit the scope of the present invention. Various variations and improvements made to the technical solutions of the present invention by ordinary skilled in the art without departing from the design spirit of the present invention shall fall within the protection scope as defined by the claims of the present invention.

What is claimed is:

1. A linear actuator for wireless charging, comprising a wireless charging plug, a power-supply control box, a motor linear actuator, and a wireless remote control, wherein the power-supply control box is electrically connected to the motor linear actuator through a lead, a wireless charging transmitter module is disposed in the wireless charging plug, a wireless charging receiver module, a storage battery, and a circuit control board are disposed in the power-supply control box, the wireless charging receiver module and the circuit control board are electrically connected to the storage battery through leads, the wireless charging plug performs wireless inductive charging on the storage battery through the wireless charging transmitter module and the wireless charging receiver module, a wireless receiver apparatus is disposed on the circuit control board, a corresponding wireless transmitter apparatus is disposed in the wireless remote control, the wireless remote control sends a control command to the circuit control board through the wireless transmitter apparatus and the wireless receiver apparatus, and the circuit control board drives the motor linear actuator to reciprocate linearly through the control command.

2. The linear actuator for wireless charging according to claim 1, wherein a charging circuit is built in the power-supply control box to convert power received by the wireless charging receiver module into 12-24V DC power, and then charges the storage battery.

3. The linear actuator for wireless charging according to claim 1, wherein the wireless charging plug is a two-pin plug or a three-pin plug, and the wireless charging plug is externally connected to a 220 V mains socket.

4. The linear actuator for wireless charging according to claim 1, wherein a switch button, a start button, a stop button, and a speed button are disposed on the surface of the wireless remote control, so that the wireless remote control sends control commands of turning on or off the power supply, starting a motor, stopping the motor and motor speed to the power-supply control box.

5. The linear actuator for wireless charging according to claim 1, wherein the wireless remote control is an infrared remote control or a radio remote control.

6. The linear actuator for wireless charging according to claim 1, wherein a control range of the wireless remote control on the power-supply control box is 0 m to 38 m.

* * * * *